United States Patent
Sakai et al.

(10) Patent No.: US 9,945,170 B2
(45) Date of Patent: Apr. 17, 2018

(54) DOOR OPENING AND CLOSING DEVICE

(71) Applicant: AISIN SEIKI KABUSHIKI KAISHA, Kariya-shi (JP)

(72) Inventors: Shin Sakai, Kariya (JP); Seiichi Suzuki, Miyoshi (JP); Eisuke Nakanishi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 7 days.

(21) Appl. No.: 15/107,359

(22) PCT Filed: Dec. 22, 2014

(86) PCT No.: PCT/JP2014/083961
§ 371 (c)(1),
(2) Date: Jun. 22, 2016

(87) PCT Pub. No.: WO2015/098868
PCT Pub. Date: Jul. 2, 2015

(65) Prior Publication Data
US 2017/0002597 A1 Jan. 5, 2017

(30) Foreign Application Priority Data
Dec. 25, 2013 (JP) .................. 2013-267865

(51) Int. Cl.
*E05F 15/643* (2015.01)
*E05F 15/655* (2015.01)
(Continued)

(52) U.S. Cl.
CPC .......... *E05F 15/643* (2015.01); *E05F 15/646* (2015.01); *E05F 15/655* (2015.01);
(Continued)

(58) Field of Classification Search
CPC ..... E05F 15/643; E05F 15/646; E05F 15/655; E05D 15/066; E05D 15/0608; B60J 5/06; E05Y 2201/652; E05Y 2900/531
See application file for complete search history.

(56) References Cited

U.S. PATENT DOCUMENTS 7,032,349 B2 * 4/2006 Oberheide .............. E05F 15/60
49/360
7,159,930 B2 * 1/2007 Yokomori .................. B60J 5/06
296/155

(Continued)

FOREIGN PATENT DOCUMENTS

JP 2011-105263 A 6/2011

OTHER PUBLICATIONS

International Search Report dated Mar. 3, 2015 for PCT/JP2014/083961 filed on Dec. 22, 2014.

(Continued)

*Primary Examiner* — Justin B Rephann
(74) *Attorney, Agent, or Firm* — Oblon, McClelland, Maier & Neustadt, L.L.P.

(57) ABSTRACT

A door opening and closing apparatus opens and closes a slide door by cooperating with a guide roller unit fixed to the slide door of a vehicle. The guide roller unit includes a guide member and a belt-side bracket connected to the guide member. The door opening and closing apparatus includes a support member made of resin, plural pulleys supported at the support member, and a transmission belt engaged at the plural pulleys. The support member is fixed to a body of the vehicle and includes a rail portion at which the guide member is mounted. The belt-side bracket is fixed to the transmission belt. An electric drive source moves the transmission belt for opening and closing the slide door in a state where the guide member is guided along the rail portion. The (Continued)

support member includes an engagement portion configured to hold the belt-side bracket.

7 Claims, 5 Drawing Sheets

(51) Int. Cl.
*E05F 15/646* (2015.01)
*B60J 5/06* (2006.01)
(52) U.S. Cl.
CPC ............ *B60J 5/06* (2013.01); *E05Y 2201/652* (2013.01); *E05Y 2900/531* (2013.01)

(56) References Cited

U.S. PATENT DOCUMENTS

| | | | | |
|---|---|---|---|---|
| 7,354,100 | B2* | 4/2008 | Yokomori | B60J 5/06 |
| | | | | 296/155 |
| 8,118,344 | B2* | 2/2012 | Takaya | B60J 5/06 |
| | | | | 296/155 |
| 9,670,708 | B2* | 6/2017 | Tsubaki | E05D 15/28 |
| 2006/0113821 | A1* | 6/2006 | Yokomori | B60J 5/06 |
| | | | | 296/155 |
| 2007/0108798 | A1* | 5/2007 | Nishimura | B60J 5/06 |
| | | | | 296/155 |
| 2010/0078961 | A1* | 4/2010 | Takaya | B60J 5/06 |
| | | | | 296/155 |
| 2012/0222914 | A1* | 9/2012 | Ishida | B60R 3/02 |
| | | | | 182/90 |
| 2012/0261894 | A1 | 10/2012 | Ishida et al. | |
| 2013/0307291 | A1* | 11/2013 | Suzuki | B60R 3/00 |
| | | | | 296/209 |
| 2013/0320704 | A1* | 12/2013 | Sumiya | B60J 5/06 |
| | | | | 296/146.1 |
| 2015/0197974 | A1* | 7/2015 | Suzuki | E05F 15/643 |
| | | | | 74/89.22 |
| 2016/0194910 | A1* | 7/2016 | Pellegrini | E05D 15/1081 |
| | | | | 49/362 |
| 2016/0257268 | A1* | 9/2016 | Tsubaki | E05F 15/646 |

OTHER PUBLICATIONS

English translation of the International Preliminary Report on Patentability and Written Opinion dated Jun. 28, 2016 in PCT/JP2014/083961.

* cited by examiner

DOOR OPENING AND CLOSING DEVICE

TECHNICAL FIELD

This invention relates to a door opening and closing apparatus for opening and closing a slide door.

BACKGROUND ART

A door opening and closing apparatus disclosed in Patent document 1, for example, is known. The aforementioned door opening and closing apparatus includes a step member fixed to a body of a vehicle and made of resin. A lower rail extending in a front-rear direction of the vehicle is provided at the step member. In addition, plural pulleys are supported at the step member in a manner that the pulleys are arranged adjacent to the lower rail in a width direction of the vehicle. A belt is engaged at the plural pulleys. The door opening and closing apparatus also includes a guide roller unit fixed to a slide door. The guide roller unit is fixed to the belt so as to integrally move with the belt and is mounted to the lower rail so as to move in the front-rear direction of the vehicle along the lower rail. The belt is driven by a drive member so as to open and close the slide door.

DOCUMENT OF PRIOR ART

Patent Document

Patent document 1: Japanese patent application publication 2011-105263

OVERVIEW OF INVENTION

Problem to be Solved by Invention

The guide roller unit disclosed in Patent document 1 includes a belt-side bracket fixed to the belt and a guide roller mounted to the lower rail. The belt-side bracket and the lower rail are separate components from each other. In a case where the step member is assembled on the body of the vehicle, the belt to which the belt-side bracket is fixed is assembled beforehand on the step member together with the plural pulleys. In this case, the belt is deflected by the weight of the belt-side bracket. Thus, a posture of the belt-side bracket, for example, is unstable, which may lead to a decrease of assembly performance.

An object of the present invention is to provide a door opening and closing apparatus which may improve an assembly performance.

Means for Solving Problem

A door opening and closing apparatus which solves the aforementioned drawback, the door opening and closing apparatus opening and closing a slide door of a vehicle by cooperating with a guide roller unit fixed to the slide door, the guide roller unit including a guide member and a belt-side bracket connected to the guide member, the door opening and closing apparatus includes a support member configured to be fixed to a body of the vehicle and including a rail portion at which the guide member is mounted, the support member being made of resin, plural pulleys supported at the support member, a transmission belt engaged at the plural pulleys, the transmission belt to which the belt-side bracket is fixed, and an electric drive source moving the transmission belt for opening and closing the slide door in a state where the guide member is guided along the rail portion, the support member including an engagement portion which is configured to hold the belt-side bracket.

MODE FOR CARRYING OUT THE INVENTION

An embodiment of a door opening and closing apparatus is explained below. In the following, a front-rear direction of a vehicle is simply referred to as a "front-rear direction". An upper side and a lower side in a height direction of the vehicle are simply referred to as an "upper side" and a "lower side". An inner side in a width direction of the vehicle towards an inside of a vehicle interior is simply referred to as a "vehicle inner side". An outer side in the width direction of the vehicle towards an outside of the vehicle interior is simply referred to as a "vehicle outer side".

Figure 6:
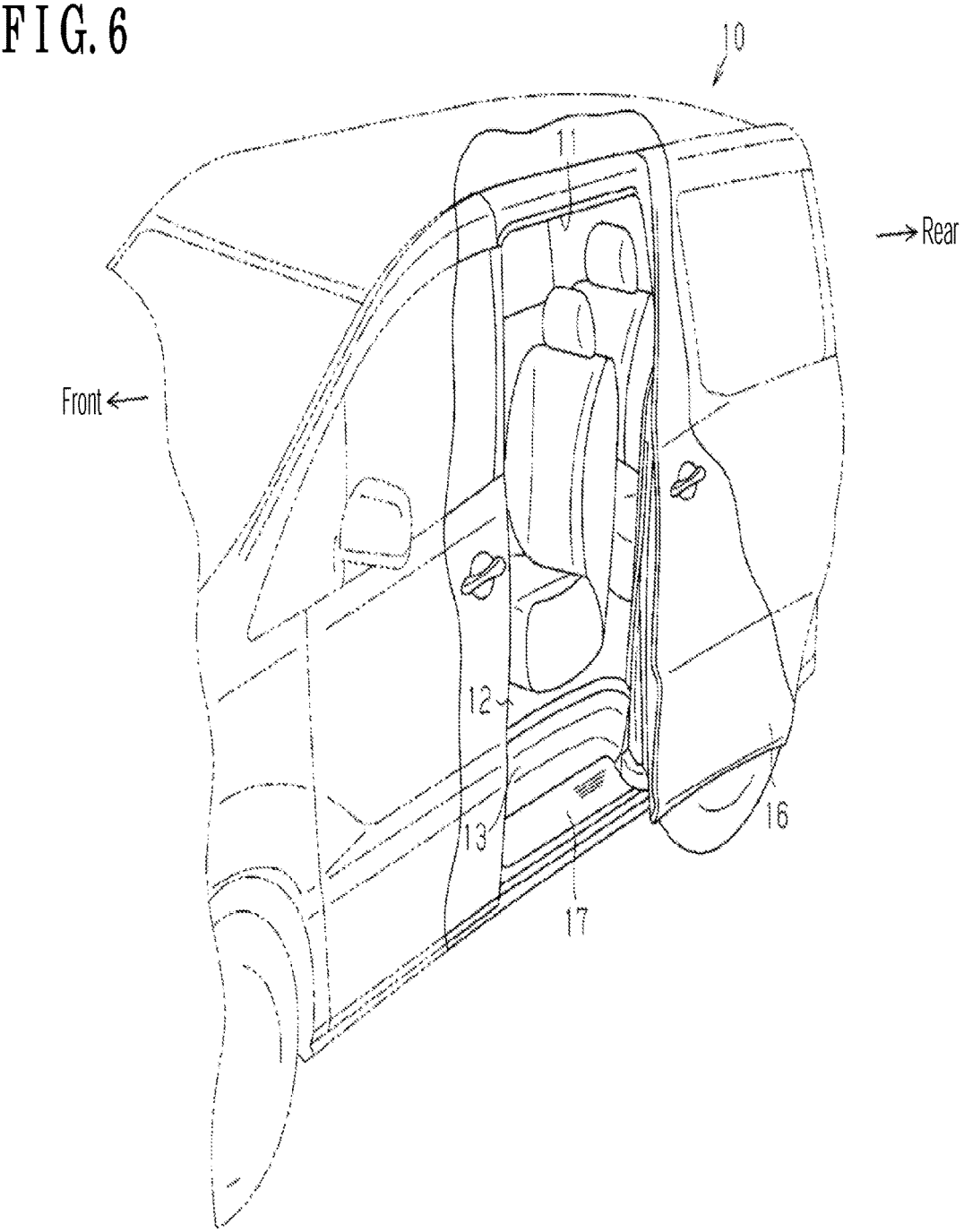
FIG. 6 is a perspective view illustrating a vehicle to which the door opening and closing apparatus in FIG. 1 is employed.

As illustrated in FIG. 6, a body 10 of the vehicle includes an opening 11 for getting in and out. A slide door 16 which opens and closes the opening 11 is supported at the body 10 so as to be movable in the front-rear direction. A recess portion 13 is provided at a floor 12 of the vehicle so as to face the opening 11. In addition, a step panel 17 serving as a support member is mounted at the recess portion 13.

Figure 1:
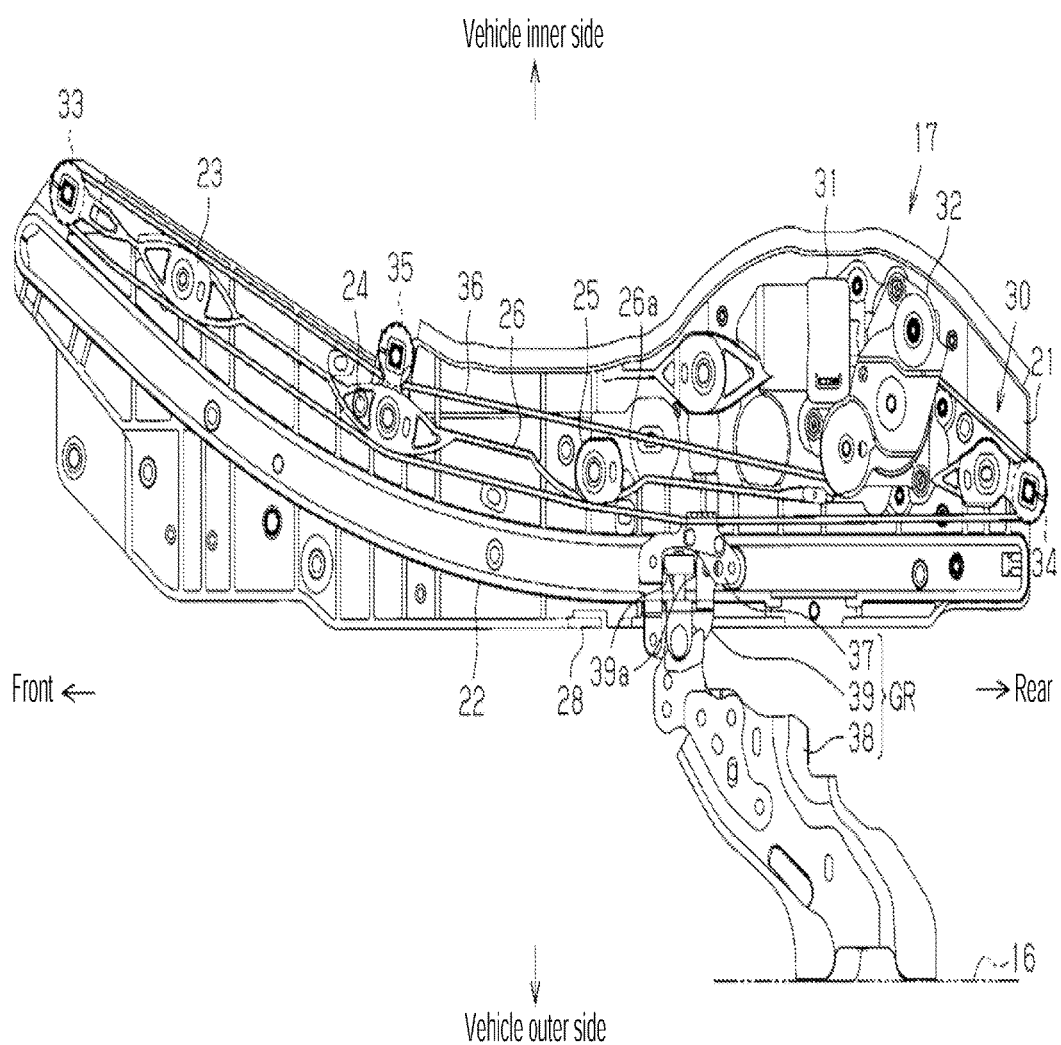
FIG. 1 is a bottom plan view illustrating a door opening and closing apparatus according to an embodiment of the present invention.

As illustrated in FIG. 1, the step panel 17 which is made of resin includes a body portion 21 in a substantially flat plate form extending in the front-rear direction. The step panel 17 also includes a lower rail 22 serving as a rail portion extending downward (front side that is orthogonal to a paper surface on which FIG. 1 is drawn) from a portion of the body portion 21 at the vehicle outer side. The lower rail 22 extends in the font-rear direction substantially along the body portion 21. The lower rail 22 includes two longitudinal walls facing each other in the vehicle width direction and extending in parallel to each other. The step panel 17 includes plural guide walls 23, 24 and 25 extending downward from the body portion 21 at positions at the vehicle inner side than the lower rail 22 and adjacent to the lower rail 22. The guide walls 23 to 25 are arranged at intervals in the front-rear direction so as to extend substantially along the lower rail 22.

A drive unit 30 is disposed at the body portion 21 so as to be positioned at the vehicle inner side than the lower rail 22 and adjacent to the lower rail 22. The drive unit 30 includes a motor 31 which includes a reducer and which is fixed to the body portion 21 at a rear side of the guide wall 25. The motor 31 serves as an electric drive source. The drive unit 30 also includes a drive pulley unit 32 driven by the motor 31. The drive unit 30 further includes a pair of pulleys, i.e., toothed driven pulleys 33, 34, and an idle pulley 35. The driven pulleys 33 and 34 are supported at a front end and a rear end of the body portion 21 so as to be rotatable around respective axes of the driven pulleys 33 and 34, the axes extending in the vehicle height direction. The idle pulley 35 is supported to be rotatable around an axis thereof extending in the vehicle height direction at the vehicle inner side than the guide wall 24 and at a portion of the body portion 21 adjacent to the guide wall 24.

The drive unit 30 includes an endless toothed belt 36 in a ring form serving as a transmission belt. The endless toothed belt 36 is wound and engaged at the driven pulleys 33 and 34, for example. The endless toothed belt 36 includes a first portion positioned at a side approaching the lower rail 22 and serving as a portion extending substantially along the lower rail 22 between the two driven pulleys 33, 34 and a second portion positioned at a side separating from the lower rail 22. The first portion makes contact with respective portions of the guide walls 23 to 25 facing the lower rail 22. The second portion is meshed with the drive pulley unit 32 and passes through between the guide wall 24 and the idle pulley 35 so as to engage with the idle pulley 35. The second portion further makes contact with a portion of the guide wall 23 at a side opposite from the lower rail 22. In a case where the drive pulley unit 32 is driven by the motor 31, the endless toothed belt 36 moves substantially along the lower rail 22 in a direction conforming to a rotation direction of the drive pulley unit 32 while the driven pulleys 33, 34, for example, are driven to rotate.

The step panel 17 includes a partition wall 26 in a stripe form extending downward from the body portion 21. The partition wall 26 extends over a substantially entire length of the endless toothed belt 36 in a longitudinal direction thereof so as to connect between the guide walls 23 to 25 adjacent to each other. The partition wall 26 is disposed between the first portion and the second portion of the endless toothed belt 36 so as to separate the first portion and the second portion from each other.

A belt-side bracket 37 in a substantially U-shape made of a metallic plate, for example, is provided at a predetermined position (in a state of FIG. 1, at a position in the vicinity of the guide wall 25) of the first portion of the endless toothed belt 36. The belt-side bracket 37 holds the endless toothed belt 36. The belt-side bracket 37 is fixed to the endless toothed belt 36 so as to integrally move with the belt 36. A door-side bracket 38 in a substantially arm form made of a metallic plate, for example, is fixed to the slide door 16. A guide member 39 mounted to the lower rail 22 to be movable thereto is connected to the door-side bracket 38. The guide member 39 is tightened to the belt-side bracket 37. Thus, in a case where the belt-side bracket 37 moves together with the endless toothed belt 36 in the front-rear direction, the slide door 16 moves together with the guide member 39 and the door-side bracket 38 in the front-rear direction. The belt-side bracket 37, the door-side bracket 38 and the guide member 39 constitute a guide roller unit GR. The guide member 39 includes a pair of rollers 39a which is rotatable around axes thereof extending in the vehicle height direction and which is rollable on the lower rail 22. The guide member 39 guides a movement of the slide door 16 in the front-rear direction.

Next, a method of connecting the belt-side bracket 37 and the guide member 39 is explained.

Figure 2:
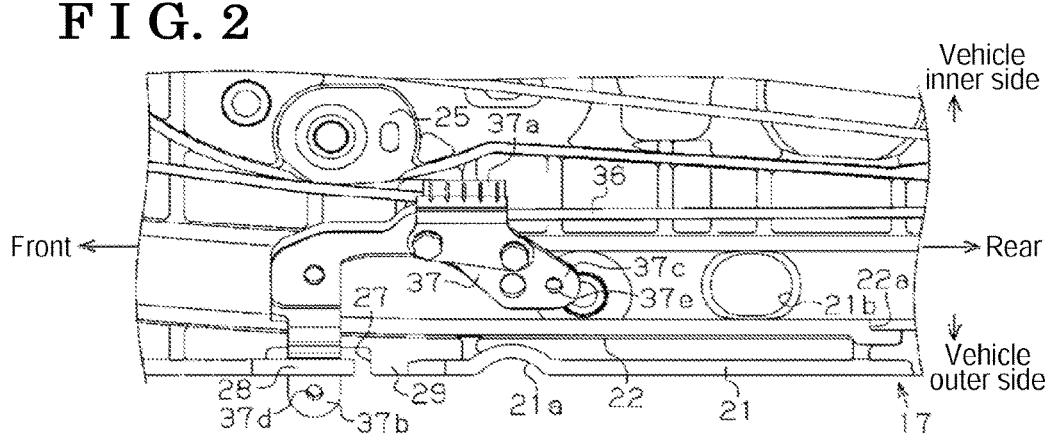
FIG. 2 is a partial bottom plan view illustrating a holding state of a belt-side bracket held by a holding piece in the door opening and closing apparatus in FIG. 1.
Figure 3A:
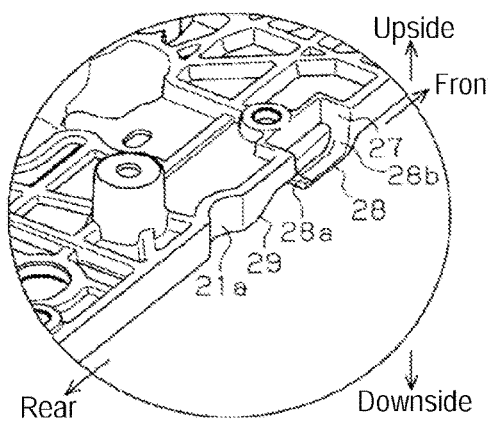
FIG. 3A is a partial perspective view illustrating a non-holding state of the belt-side bracket in the door opening and closing apparatus in FIG. 1.
Figure 3B:
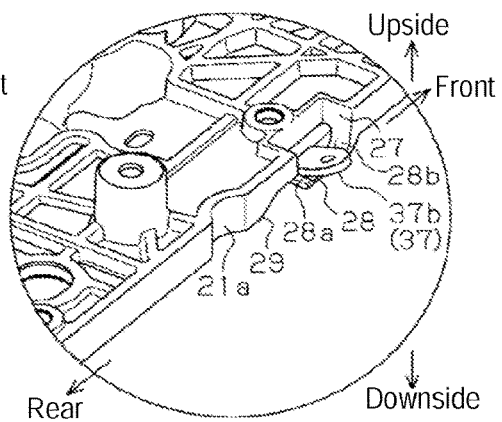
FIG. 3B is a partial perspective view illustrating the holding state of the belt-side bracket held by the holding piece.
Figure 4:
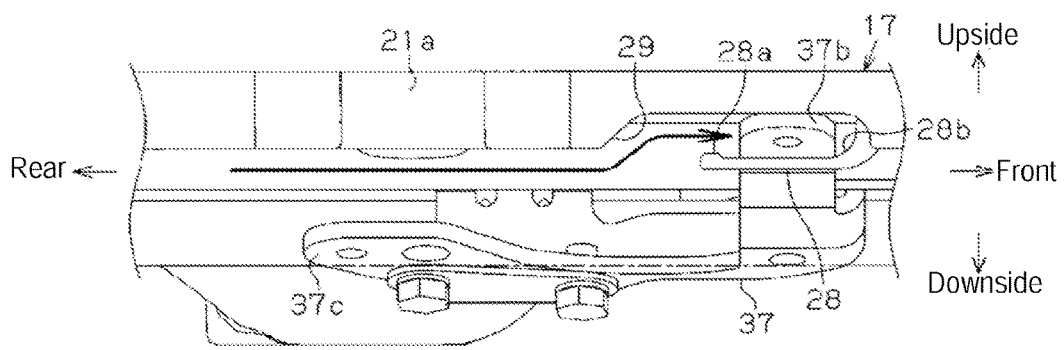
FIG. 4 is a partial front view in a state where the door opening and closing apparatus in FIG. 1 is viewed from an outer side in a vehicle width direction.

As illustrated in FIGS. 2, 3A and 3B, the body portion 21 includes an accommodation recess portion 27 in a substantially quadrangular form recessed towards the vehicle inner side from an end surface of the body portion 21 at the vehicle outer side at a position in the vicinity of the guide wall 25. The body portion 21 also includes an engagement piece 28 serving as an engagement portion extending rearward from a lower end of a front inner wall surface of the accommodation recess portion 27. A protruding portion 28a protruding upward is provided at a rear end (tip end) of the engagement piece 28. The body portion 21 includes a work recess portion 21a in a substantially arc form recessed towards the vehicle inner side from the end surface of the body portion 21 at the vehicle outer side at a position adjacent to the accommodation recess portion 27 at a rear side thereof. A guide recess portion 29 in a slope form is provided at a vehicle outer side end of the body portion 21 so as to be recessed upwards from a lower end surface of the body portion 21 towards the accommodation recess portion 27 from the work recess portion 21a. As also illustrated in FIG. 4, a groove portion 28b is provided at an upper side of the engagement piece 28, i.e., between the engagement piece 28 and the bottom surface of the body portion 21. The groove portion 28b opens obliquely rearward in a state being enlarged in the vehicle height direction by the guide recess portion 29.

The body portion 21 includes a work bore 21b at a rear side than the work recess portion 21a and at a portion within the lower rail 22. The work bore 21b in a substantially oval form penetrates in the vehicle height direction. The lower rail 22 includes a slot 22a provided at a further rear side than the work bore 21b. The slot 22a is obtained by cutting one of the longitudinal walls of the lower rail 22 at the vehicle outer side. The inside of the lower rail 22 is in communication with the vehicle outer side via the slot 22a.

The belt-side bracket 37 includes a fixation portion 37a holding the endless toothed belt 36, a first connection piece 37b in a substantially L-shape extending forward from the fixation portion 37a and extending to the vehicle outer side, and a second connection piece 37c in a substantially arm form extending obliquely rearward to the vehicle outer side from the fixation portion 37a. A tip end of the first connection piece 37b protrudes to the vehicle outer side beyond the body portion 21 by crossing the lower rail 22. A tip end of the second connection piece 37c is positioned at a lower side of the lower rail 22. It is obvious that the fixation portion 37a is positioned at the vehicle inner side than the lower rail 22. A first connection bore 37d and a second connection bore 37e each of which is in a substantially circular form are provided at respective tip end portions of the first and second connection pieces 37b and 37c, the first connection bore 37d and the second connection bore 37e penetrating in the vehicle height direction.

In a state before the step panel 17 is assembled on the body 10 (recess portion 13), the belt-side bracket 37 is inclined in a manner that the tip end of the first connection piece 37b is raised so that the tip end of the first connection piece 37b is inserted to be positioned within the groove portion 28b while the endless toothed belt 36 is being twisted at the fixation portion 37a. The position of the belt-side bracket 37 at this time is referred to as a holding position. The belt-side bracket 37 is held at the engagement piece 28 in a state where a downward movement and an upward movement of the belt-side bracket 37 are both restricted by the groove portion 28b (engagement piece 28). At this time, a rotation of the belt-side bracket 37 in the twisted direction of the endless toothed belt 36 is also restricted. In a case where the first connection piece 37b engages or disengages relative to the engagement piece 28 while the endless toothed belt 36 is being twisted with the movement of the belt-side bracket 37 in the front-rear direction, the engagement and disengagement of the first connection piece 37b is guided by the guide recess portion 29. For example, as illustrated by an arrow in FIG. 4, in a case where the belt-side bracket 37 is moved forward so that the first connection piece 37b engages with the engagement piece 28, the endless toothed belt 36 is twisted for moving the first connection piece 37b along the guide recess portion 29 so that the first connection piece 37b enters into the groove portion 28b.

In the aforementioned construction, in a case of connecting the belt-side bracket 37 and the guide member 39 to each other, the lower rail 22, for example, is directed downwards in a state where the belt-side bracket 37 is held at the engagement piece 28 as illustrated in FIG. 2. In the aforementioned state, the step panel 17 is joined to the body 10.

Next, as illustrated by a transition from FIG. 2 to FIG. 5A, the belt-side bracket 37 is moved rearward so that the tip end of the first connection piece 37b is guided by the guide recess portion 29 to disengage from the groove portion 28b (engagement piece 28) and the first connection piece 37b reaches the work recess portion 21a. At this time, the second connection bore 37e of the second connection piece 37c is substantially coaxially arranged with the work bore 21b. Therefore, in the aforementioned state, a working space around the first connection bore 37d is enlarged by the work recess portion 21a and a working space at an upper side of the second connection bore 37e is secured by the work bore 21b. The position of the belt-side bracket 37 at this time is referred to as an assembly position. It is obvious that a moving direction of the belt-side bracket 37 from the holding position to the assembly position, i.e., a moving direction of the belt-side bracket 37 in a case where the belt-side bracket 37 is released from the engagement piece 28, matches an opening direction of the slide door 16.

The partition wall 26 includes a bending portion 26a provided at the rear side of the guide wall 25 and at the position adjacent to the guide wall 25. The bending portion 26a is bent to protrude to the vehicle inner side. Because of the bending portion 26a, a distance between the lower rail 22 and the partition wall 26 at a position of the fixation portion 37a of the belt-side bracket 37 which is placed at the assembly position is greater than a distance between the lower rail 22 and the partition wall 26 at a position of the fixation portion 37a of the belt-side bracket 37 which is placed at the holding position. That is, in a case where the distance between the lower rail 22 and the partition wall 26 at the position of the fixation portion 37a of the belt-side bracket 37 placed at the assembly position is specified to be a distance L1 and the distance between the lower rail 22 and the partition wall 26 at the position of the fixation portion 37a of the belt-side bracket 37 placed at the holding position is specified to be a distance L2, a relation of L1>L2 is satisfied.

Figure 5A:
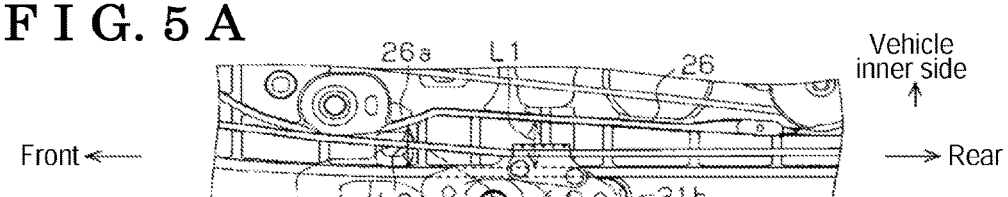
FIGS. 5A, 5B, 5C and 5D are partial bottom plan views each of which illustrates an assembly method of the door opening and closing apparatus in FIG. 1.
Figure 5B:
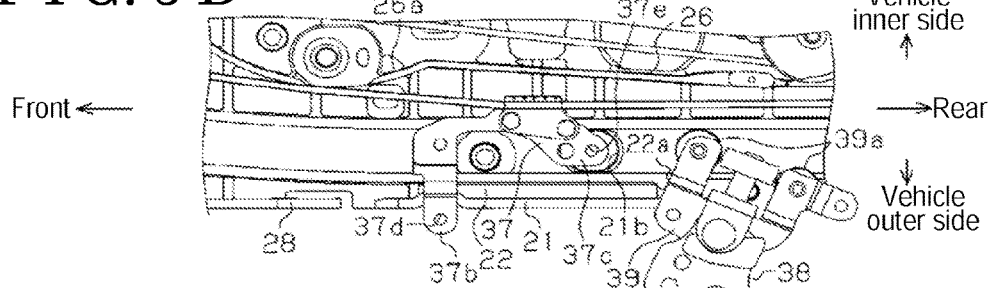

Next, in a case where the slide door 16 is assembled on the body 10 from the vehicle outer side as illustrated in FIG. 5B, the guide member 39 is inclined relative to the door-side bracket 38 in a manner that the front roller 39a is positioned closer to the vehicle inner side than the rear roller 39a. Then, the respective rollers 39a are sequentially inserted from the slot 22a into the lower rail 22 so as to be mounted within the lower rail 22. At this time, the guide member 39 passes through a gap provided in the vehicle height direction between one of the longitudinal walls of the lower rail 22 at the vehicle outer side and a surface of the recess portion 13 facing the aforementioned longitudinal wall so that the guide member 39 may be inhibited from interfering with the surface of the recess portion 13, for example. It is obvious that the slide door 16 is disposed at a position conforming to an open state thereof in a case where the slide door 16 is assembled on the body 10.

Figure 5C:
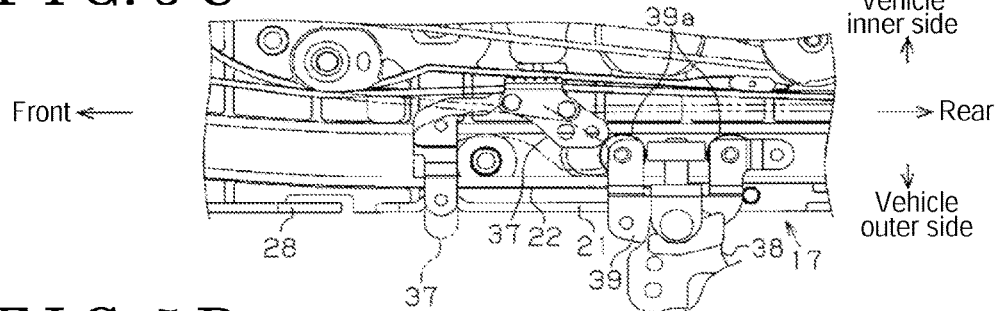

Next, as illustrated in FIG. 5C, the guide member 39 (slide door 16) is moved forward in a state where the respective rollers 39a mounted within the lower rail 22 are rolled forward along the lower rail 22. At this time, the belt-side bracket 37 placed at the assembly position is moved beforehand to the vehicle inner side until the fixation portion 37a of the belt-side bracket 37 makes contact with the partition wall 26, so that the belt-side bracket 37 is retracted as much as possible from a moving locus of the guide member 39. Interference between the guide member 39 and the belt-side bracket 37 is restrained accordingly. Specifically, because of the bending portion 26a as mentioned above, the distance (L1) between the lower rail 22 and the partition wall 26 at the position of the fixation portion 37a of the belt-side bracket 37 placed at the assembly position is enlarged to greatly displace the belt-side bracket 37 from the lower rail 22. As a result, the belt-side bracket 37 may be greatly retracted from the moving locus of the guide member 39.

Figure 5D:
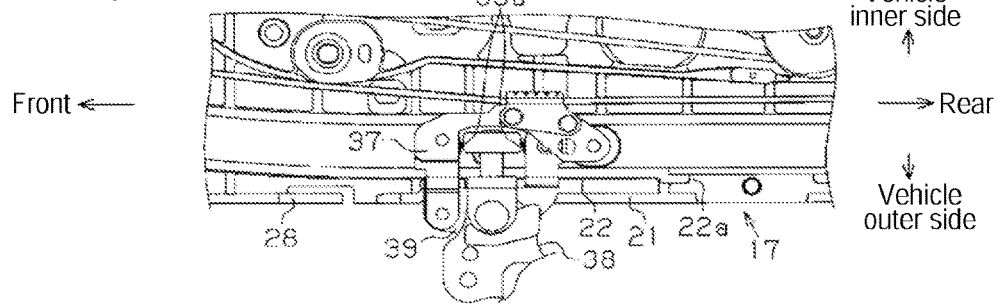

As illustrated in FIG. 5D, in a case where the rollers 39a reach respective upper sides of the first and second connection pieces 37b and 37c with the forward movement of the guide member 39 (slide door 16), the rollers 39a pass over the slot 22a. Thus, the rollers 39a are inhibited from disengaging from the lower rail 22 through the slot 22a. Next, a fastener (for example, a bolt not illustrated) penetrates through the guide member 39 from an upper side along the work recess portion 21a to be inserted to the first connection bore 37d so that the fastener is tightened to the guide member 39. In addition, a fastener (for example, a bolt not illustrated) penetrates through the guide member 39 from an upper side along the work bore 21b to be inserted to the second connection bore 37e so that the fastener is tightened to the guide member 39. Accordingly, the belt-side bracket 37 and the guide member 39 are connected to each other. Each of the work recess portion 21a and the work bore 21b functions to secure a space for inserting a jig for the fastener in a fastening operation.

After the belt-side bracket 37 and the guide member 39 are connected, the slot 22a is closed by an appropriate closure plate (not illustrated). Consequently, the rollers 39a are rollable over a substantially entire length of the lower rail 22 so that the slide door 16 is supported to be movable in the front-rear direction.

Next, an operation of the embodiment is explained.

In a case where the step panel 17 where the endless toothed belt 36 to which the belt-side bracket 37 is fixed beforehand is assembled together with the driven pulleys 33, 34, for example, is fixed to the body 10 (recess portion 13), the belt-side bracket 37 is held by the engagement piece 28 to thereby stabilize the posture of the belt-side bracket 37. Accordingly, the belt-side bracket 37 is inhibited from interfering with peripheral components, which is caused, for example, by hanging down of the belt-side bracket 37 by its own weight, and is inhibited from being sandwiched between the body 10 and the step panel 17. The assembly performance therefore increases.

As mentioned above, the following effects are obtainable by the present embodiment.

(1) In the embodiment, the posture of the belt-side bracket 37 is stabilized to thereby increase the assembly performance. After the step panel 17 is fixed to the body 10, the belt-side bracket 37 is connected to the guide member 39 in a state where the belt-side bracket 37 is released from the engagement piece 28, which may not influence the opening and closing operation of the slide door 16.

(2) In the embodiment, in a case where the belt-side bracket 37 is released from the engagement piece 28, the belt-side bracket 37 moves in the direction that matches the opening direction of the slide door 16. Thus, in a case where the belt-side bracket 37 and the guide member 39 are connected to each other at a position where the aforementioned release is completed (at the assembly position), the slide door 16 is in a further opened state. The working space is therefore enlarged to further improve the assembly performance.

In addition, the belt-side bracket 37 and the guide member 39 may be connected to each other without reversing the moving direction of the belt-side bracket 37 from the position at which the release is completed, for example. The assembly performance may be further enhanced.

(3) In the embodiment, the assembly position at which the operation for connecting the belt-side bracket 37 and the guide member 39 is performed is disposed at a substantially intermediate position between the engagement piece 28 and the slot 22a in the opening and closing direction of the slide door 16. Thus, in a case where the belt-side bracket 37 and the guide member 39 are connected to each other, the guide member 39 of which the rollers 39a enter within the lower rail 22 via the slot 22a moves in a direction that matches the closing direction of the slide door 16. That is, in a case where the belt-side bracket 37 and the guide member 39 are connected to each other, the belt-side bracket 37 and the guide member 39 move to come closer to each other in the opening and closing direction of the slide door 16. Moving distances of the belt-side bracket 37 and the guide member 39 are both restrained to thereby further improve the assembly performance.

In addition, because the guide member 39 moves in the direction matching the closing direction of the slide door 16, the rollers 39a are away from the slot 22a. Thus, the rollers 39a are restrained from disengaging from the lower rail 22, thereby further improving the assembly performance.

(4) In the embodiment, the guide recess portion 29 guides the tip end of the belt-side bracket 37 in a direction separating from the step panel 17 in the vehicle height direction in accordance with the movement of the belt-side bracket 37 in the direction being released from the engagement piece 28. Thus, in a case where the tip end of the belt-side bracket 37 (first connection piece 37b) is restricted from moving downward by the engagement piece 28, the tip end is guided by the guide recess portion 29 to be close to the step panel 17. Thus, in a case where the step panel 17 where the endless toothed belt 36 to which the belt-side bracket 37 is fixed beforehand is assembled together with the driven pulleys 33, 34, for example, is fixed to the body 10 (recess portion 13), the tip end of the belt-side bracket 37 is further closely in contact with the step panel 17. Possibility of the tip end to interfere with the peripheral components may be reduced.

(5) In the embodiment, in the belt-side bracket 37 which is not yet connected to the guide member 39, a fixation position of the belt-side bracket 37 relative to the endless toothed belt 36 (i.e., the fixation portion 37a), for example, may be displaced relative to the lower rail 22 to a point where the belt-side bracket 37 makes contact with the partition wall 26. The belt-side bracket 37 is greatly displaced relative to the lower rail 22 in a state being placed at the assembly position than in a state being placed at the holding position. Accordingly, in a case where the belt-side bracket 37 and the guide member 39 are connected to each other in a state where the belt-side bracket 37 is placed at the assembly position, i.e., in a case where the guide member 39 of which the rollers 39a enter within the lower rail 22 via the slot 22a moves towards the belt-side bracket 37, for example, the belt-side bracket 37 may be greatly displaced relative to the lower rail 22. The interference between the belt-side bracket 37 and the guide member 39 may be restrained accordingly.

(6) In the embodiment, possibility of the belt-side bracket 37 to interfere with the peripheral components may decrease in a process in which the step panel 17 where the endless toothed belt 36 to which the belt-side bracket 37 is fixed beforehand is assembled together with the driven pulleys 33, 34, for example, is conveyed to be fixed to the body 10 or the slide door 16.

(7) In the embodiment, in a state where the belt-side bracket 37 is held at the engagement piece 28, the endless toothed belt 36 is twisted. Thus, the first connection piece 37b is biased to make contact with the engagement piece 28 by an elastic force of the endless toothed belt 36. Therefore, the rotation of the belt-side bracket 37 in the twisted direction of the endless toothed belt 36 may be securely restricted. In addition, by cooperation between the twist and tension of the endless toothed belt 36, the movement of the belt-side bracket 37 in the front-rear direction may be restricted.

(8) In the embodiment, in a state where the first connection piece 37b is in contact with the engagement piece 28, the protruding portion 28a is positioned at the rear side of the first connection piece 37b. Thus, the rearward movement of the belt-side bracket 37 may be lightly restricted by the protruding portion 28a.

The aforementioned embodiment may be modified as follows.

Figure 7A:
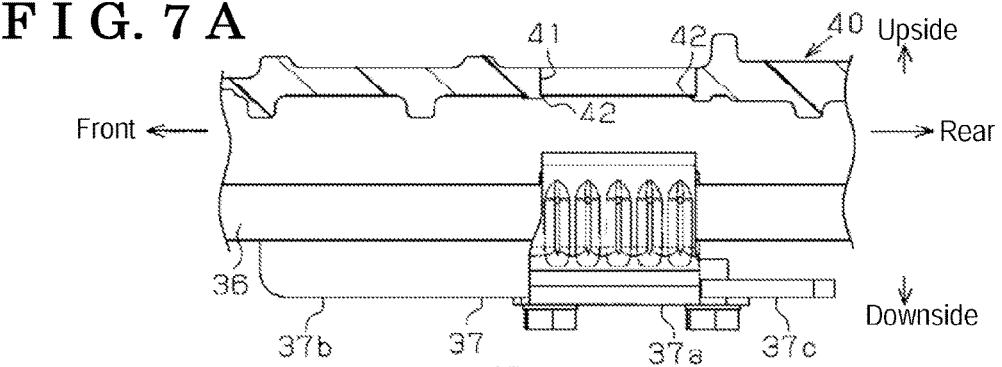
FIG. 7A is a partial cross-sectional view in a state where the door opening and closing apparatus according to a modified example of the present invention is viewed from an inner side in the vehicle width direction.
Figure 7B:
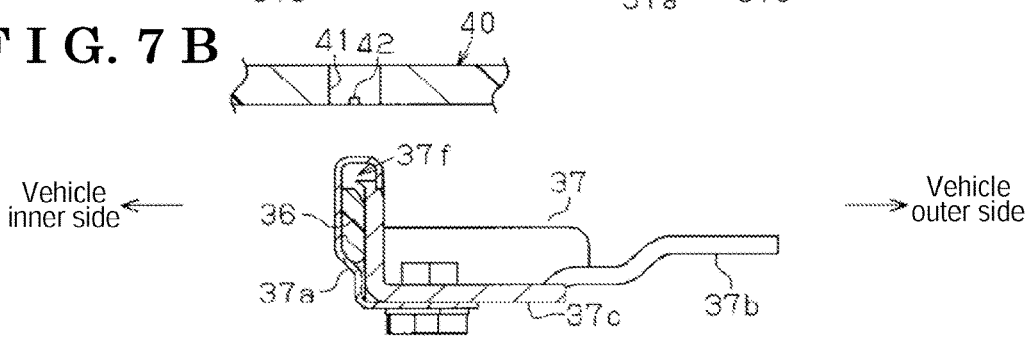
FIG. 7B is a partial cross-sectional view in a state where the door opening and closing apparatus in FIG. 7A is viewed from a rear side of the vehicle.

As illustrated in FIGS. 7A and 7B, a step panel 40 including a construction corresponding to the step panel 17 includes a substantially quadrangular holding bore 41 at a position conforming to the fixation portion 37a of the belt-side bracket 37 which is placed at the holding position, the holding bore 41 penetrating in the vehicle height direction. An opening width of the holding bore 41 in the front-rear direction is specified to be substantially the same as dimensions of the fixation portion 37a in the front-rear direction. An opening width of the holding bore 41 in the vehicle width direction is specified to be substantially the same as dimensions of the fixation portion 37a in the vehicle width direction. In addition, the step panel 40 includes a pair of engagement protrusions 42 serving as the engagement portion protruding in the front-rear direction from lower end center portions of respective inner wall surfaces at a front side and a rear side of the holding bore 41 so as to face each other. That is, the engagement protrusions 42 are arranged to be displaced in the vehicle height direction from the moving locus of the endless toothed belt 36. The fixation portion 37a of the belt-side bracket 37 protrudes upward relative to the first and second connection pieces 37b and 37c. A through-hole 37f is provided at the upper side of the endless toothed belt 36 which is held by the fixation portion 37a, the through-hole 37f penetrating in the front-rear direction.

Figure 8A:
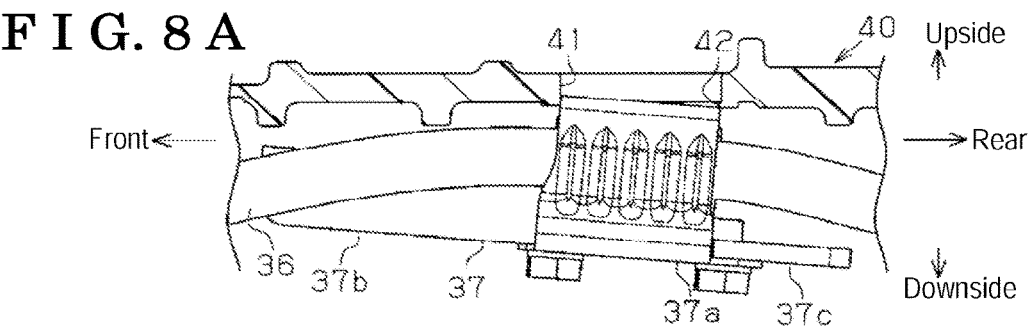
FIGS. 8A and 8B are partial cross-sectional views for explaining an operation of the door opening and closing apparatus in FIG. 7A.
Figure 8B:
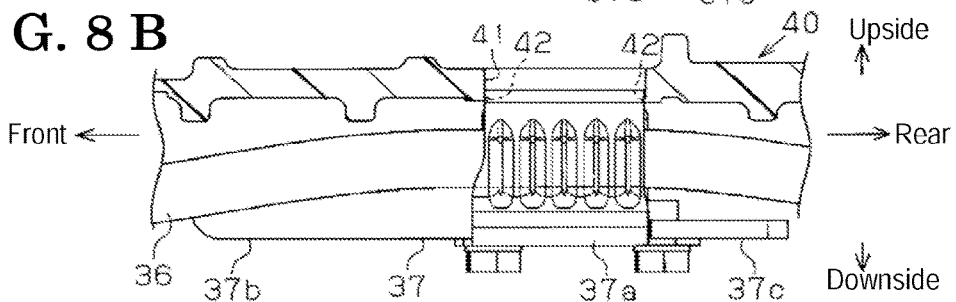

In the aforementioned construction, in a case where the belt-side bracket 37 is tentatively retained at the step panel 40, first, the fixation portion 37a is arranged at the lower side of the holding bore 41. Then, as illustrated in FIG. 8A, the fixation portion 37a is inclined so that the front end thereof is raised as compared to the rear end thereof, for example, thereby engaging the front end of the through-hole 37f with the front engagement protrusion 42. Next, as illustrated in FIG. 8B, the rear end of the fixation portion 37a is raised so that the fixation portion 37a turns to be substantially horizontal, thereby engaging the rear end of the through-hole 37f with the rear engagement protrusion 42. As a result, an upper end of the fixation portion 37a is fitted in the holding bore 41.

Accordingly, the belt-side bracket 37 engages with the engagement protrusions 42 so as to be held thereat. In a case where the step panel 17 in the aforementioned state is fixed to the body 10 (recess portion 13), the posture of the belt-side bracket 37 is stabilized. After the step panel 17 is joined to the body 10, the fixation portion 37a is pushed downward from the upper side of the holding bore 41 or the fixation portion 37a is pulled downward so that the fixation portion 37a disengages from the engagement protrusions 42. Such disengagement may be obtained by elastic deformation of each of the engagement protrusions 42 or obtained by breaking of each of the engagement protrusions 42. Afterwards, the guide member 39 where the rollers 39a are mounted is connected to the belt-side bracket 37 in the similar manner to the aforementioned embodiment.

Even with the aforementioned modification, effects similar to the effects (1) and (6) of the embodiment are obtained. Specifically, because each of the engagement protrusions 42 is arranged so as to be displaced in the vehicle height direction from the normal moving locus of the endless toothed belt 36, the movement of the endless toothed belt 36 is inhibited from being blocked after the belt-side bracket 37 is released.

The width between the lower rail 22 and the partition wall 26 may be reduced towards the upper side so that the lower rail and the partition wall hold the belt-side bracket 37 at a portion where the aforementioned width is reduced. That is, the lower rail and the partition wall may constitute the engagement portion.

Even with the aforementioned modification, effects similar to the effects (1) and (6) of the embodiment are obtained. The engagement portion in this case is arranged to be displaced in the vehicle height direction from the normal moving locus of the endless toothed belt 36. Thus, the movement of the endless toothed belt 36 is inhibited from being blocked after the belt-side bracket 37 is released. The engagement portion may be constituted with a simple construction.

In the embodiment, in the belt-side bracket 37 which is not yet connected to the guide member 39, the fixation position (i.e., the fixation portion 37a) of the belt-side bracket 37 relative to the endless toothed belt 36 is not necessarily displaced to the point where the belt-side bracket 37 makes contact with the partition wall 26 and may be simply displaced so as to come closer to the partition wall 26.

In the embodiment, the distance between the lower rail 22 and the partition wall 26 at the position of the fixation portion 37a of the belt-side bracket 37 which is placed at the assembly position may be reduced than the distance between the lower rail 22 and the partition wall 26 at the position of the fixation portion 37a of the belt-side bracket 37 which is placed at the holding position or may be equal to the distance between the lower rail 22 and the partition wall 26 at the position of the fixation portion 37a of the belt-side bracket 37 which is placed at the holding position. In addition, the partition wall 26 may be omitted.

In the embodiment, the guide recess portion 29 may be omitted as long as a space in the vehicle height direction is secured at the upper side of the engagement piece 28 for holding the tip end of the belt-side bracket 37 (first connection piece 37b).

In the embodiment, the assembly position of the belt-side bracket 37 may be the position of the slot 22a or the position in the rear of the slot 22a. In the embodiment, the moving direction of the belt-side bracket 37 in a case where the belt-side bracket 37 is released from the engagement piece 28 may match the closing direction of the slide door 16.

In the embodiment, the engagement piece 28 may be removed after the belt-side bracket 37 and the guide member 39 are connected, for example. In the embodiment, instead of a combination of the driven pulley 33, 34 and the endless toothed belt 36, a combination of a toothless pulley and a toothless endless belt or wire may be employed or a combination of a sprocket and a chain may be employed as a combination of the pulley and the transmission belt.

In the embodiment, the step panel 17 also functions as the support member. Alternatively, being different from the step panel 17, a support member made of resin may be provided.

The invention claimed is:

1. A door opening and closing apparatus opening and closing a slide door of a vehicle by cooperating with a guide roller unit fixed to the slide door, the guide roller unit including a guide member and a belt-side bracket connected to the guide member, the door opening and closing apparatus comprising:

a support member configured to be fixed to a body of the vehicle and including a rail portion at which the guide member is mounted, the support member being made of resin;

plural pulleys supported at the support member;

a transmission belt engaged at the plural pulleys, the transmission belt to which the belt-side bracket is fixed; and an electric drive source moving the transmission belt to open and close the slide door in a state where the guide member is guided along the rail portion, wherein the support member includes an engagement portion which is configured to hold the belt-side bracket, a moving direction of the belt-side bracket in a case where the belt-side bracket is released from the engagement portion matches an opening direction of the slide door, the guide member includes a roller rollable on the rail portion, the rail portion includes a slot which allows the roller to enter within the rail portion, and an assembly position at which a connecting operation of the belt-side bracket and the guide member is performed is arranged at an intermediate position between the engagement portion and the slot in an opening and closing direction of the slide door.

2. The door opening and closing apparatus according to claim 1, wherein the transmission belt includes a first portion provided near the rail portion and a second portion provided away from the rail portion,
the support member includes a partition wall separating the first portion and the second portion of the transmission belt from each other,
the belt-side bracket includes a fixation portion fixed to the transmission belt,
a distance between the rail portion and the partition wall at a position of the fixation portion of the belt-side bracket which is placed at the assembly position is greater than a distance between the rail portion and the partition wall at a position of the fixation portion of the belt-side bracket which is held at a holding position by the engagement portion.

3. The door opening and closing apparatus according to claim 1, wherein the engagement portion is arranged to be displaced in a height direction of the vehicle from the transmission belt.

4. The door opening and closing apparatus according to claim 3, wherein the transmission belt includes a first portion provided near the rail portion and a second portion provided away from the rail portion,
the support member includes a partition wall separating the first portion and the second portion of the transmission belt from each other,
a width between the rail portion and the partition wall is reduced towards an upper side of the vehicle, the rail portion and the partition wall constituting the engagement portion to hold the belt-side bracket at a portion where the width is reduced.

5. The door opening and closing apparatus according to claim 1, wherein the transmission belt is twisted in a state where the engagement portion holds the belt-side bracket.

6. A door opening and closing apparatus opening and closing a slide door of a vehicle by cooperating wither guide roller unit fixed to the slide door, the guide roller unit including a guide member and a belt-side bracket connected to the guide member, the door opening and closing apparatus comprising:
a support member configured to be fixed to a body of the vehicle and including a rail portion at which the guide member is mounted, the support member being made of resin;
plural pulleys supported at the support member;
a transmission belt engaged at the plural pulleys, the transmission belt to which the belt-side bracket is fixed; and
an electric drive source moving the transmission belt to open and close the slide door in a state where the guide member is guided along the rail portion,
wherein
the support member includes an engagement portion which is configured to hold the belt-side bracket,
a moving direction of the belt-side bracket in a case where the belt-side bracket is released from the engagement portion matches an opening direction of the slide door,
the belt-side bracket includes a fixation portion fixed to the transmission belt and a tip end separated from the fixation portion,
the engagement portion is configured to hold the belt-side bracket for restricting to restrict the tip end of the belt-side bracket from moving in a height direction of the vehicle,
the support member includes a guide recess portion configured to guide the tip end of the belt-side bracket to move in a direction separating from the support member in a height direction of the vehicle in accordance with a movement of the belt-side bracket in a direction where the belt-side bracket is released from the engagement portion.

7. A door opening and closing apparatus opening and closing a slide door of a vehicle by cooperating with a guide roller unit fixed to the slide door, the guide roller unit including a guide member and a belt-side bracket connected to the guide member, the door opening and closing apparatus comprising:
a support member configured to be fixed to a body of the vehicle and including a rail portion at which the guide member is mounted, the support member being made of resin;
plural pulleys supported at the support member;
a transmission belt engaged at the plural pulleys, the transmission belt to which the belt-side bracket is fixed; and
an electric drive source moving the transmission belt to open and close the slide door in a state where the guide member is guided along the rail portion,
wherein
the support member includes an engagement portion which is configured to hold the belt-side bracket,
the engagement portion is arranged to be displaced in a height direction of the vehicle from the transmission belt,
the support member includes a holding bore penetrating in a height direction of the vehicle, and
the engagement portion is an engagement protrusion protruding from an inner wall of the holding bore, the engagement protrusion being engageable at the belt-side bracket.

* * * * *